US012800047B2

(12) United States Patent
Kuriki et al.

(10) Patent No.: US 12,800,047 B2
(45) Date of Patent: Nov. 17, 2026

(54) FLUID CONTROL APPARATUS AND HEATER

(71) Applicant: FUJIKIN INCORPORATED, Osaka (JP)

(72) Inventors: Haruhiko Kuriki, Osaka (JP); Shinya Nogari, Osaka (JP); Masato Tanaka, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 19/125,356

(22) PCT Filed: Sep. 8, 2023

(86) PCT No.: PCT/JP2023/032796
§ 371 (c)(1),
(2) Date: Apr. 29, 2025

(87) PCT Pub. No.: WO2024/116534
PCT Pub. Date: Jun. 6, 2024

(65) Prior Publication Data

US 2026/0071690 A1 Mar. 12, 2026

(30) Foreign Application Priority Data

Nov. 28, 2022 (JP) ................................ 2022-188987

(51) Int. Cl.
*F16K 27/00* (2006.01)
*F16K 27/12* (2006.01)
*F16K 49/00* (2006.01)

(52) U.S. Cl.
CPC ............ *F16K 27/003* (2013.01); *F16K 27/12* (2013.01); *F16K 49/00* (2013.01); *Y10T 137/6606* (2015.04); *Y10T 137/87885* (2015.04)

(58) Field of Classification Search
CPC ....................... F16K 27/003; Y10T 137/87885
See application file for complete search history.

(56) References Cited

U.S. PATENT DOCUMENTS 3,733,459 A * 5/1973 Lengstorf ................ H05B 3/00 219/535
5,983,933 A * 11/1999 Ohmi .................... F16K 27/003 137/613

(Continued)

FOREIGN PATENT DOCUMENTS

JP H11-294615 A 10/1999
JP 2001-153289 A 6/2001

(Continued)

OTHER PUBLICATIONS

International Search Report issued in International Patent Application No. PCT/JP2023/032796, dated Nov. 28, 2023, along with an English translation thereof.

*Primary Examiner* — Robert K Arundale
(74) *Attorney, Agent, or Firm* — Greenblum & Bernstein, P.L.C.

(57) ABSTRACT

A fluid control apparatus includes: an integrated gas line including a plurality of flow path blocks arranged in series to form a flow path and a plurality of fluid control devices arranged on the flow path blocks, and a supply pipe arranged under the flow path blocks and allowing a fluid to flow therethrough; and a branch pipe branched from the supply pipe and supplying a fluid to the integrated gas line; the fluid control apparatus further includes: a first heater arranged on each of both sides of the flow path blocks; a heat transfer block for transferring heat to the supply pipe; a second heater arranged on each of both sides of the heat transfer block for heating the heat transfer block, and a heat insula- (Continued)

tion plate arranged between the flow path blocks and the heat transfer block for preventing heat transfer.

7 Claims, 11 Drawing Sheets

(56) References Cited

U.S. PATENT DOCUMENTS

| | | | | | |
|---|---|---|---|---|---|
| 6,014,498 | A * | 1/2000 | Ikeda | F16K 49/00 | 219/535 |
| 6,361,081 | B1 * | 3/2002 | Yokoyama | F16K 27/003 | 285/124.3 |
| 6,394,138 | B1 * | 5/2002 | Vu | C23C 16/44 | 137/884 |
| 11,390,951 | B2 * | 7/2022 | Hidaka | C23C 16/4485 | |
| 2003/0005959 | A1 * | 1/2003 | Yamaji | F24H 1/121 | 137/341 |
| 2005/0229972 | A1 * | 10/2005 | Hoshi | F16K 49/002 | 137/341 |
| 2007/0169819 | A1 * | 7/2007 | Shikata | F16K 49/00 | 137/341 |
| 2022/0120355 | A1 * | 4/2022 | Kuriki | F16K 27/003 | |

FOREIGN PATENT DOCUMENTS

| | | | |
|---|---|---|---|
| JP | 2003-65462 | A | 3/2003 |
| JP | 2006-100643 | A | 4/2006 |
| JP | 2010-053907 | A | 3/2010 |
| JP | 5753831 | B2 | 7/2015 |
| JP | 2016-205553 | A | 12/2016 |
| JP | 2020-159445 | A | 10/2020 |
| JP | 2021-107715 | A | 7/2021 |
| JP | 2021107715 | * | 7/2021 |

* cited by examiner

【fig. 1】
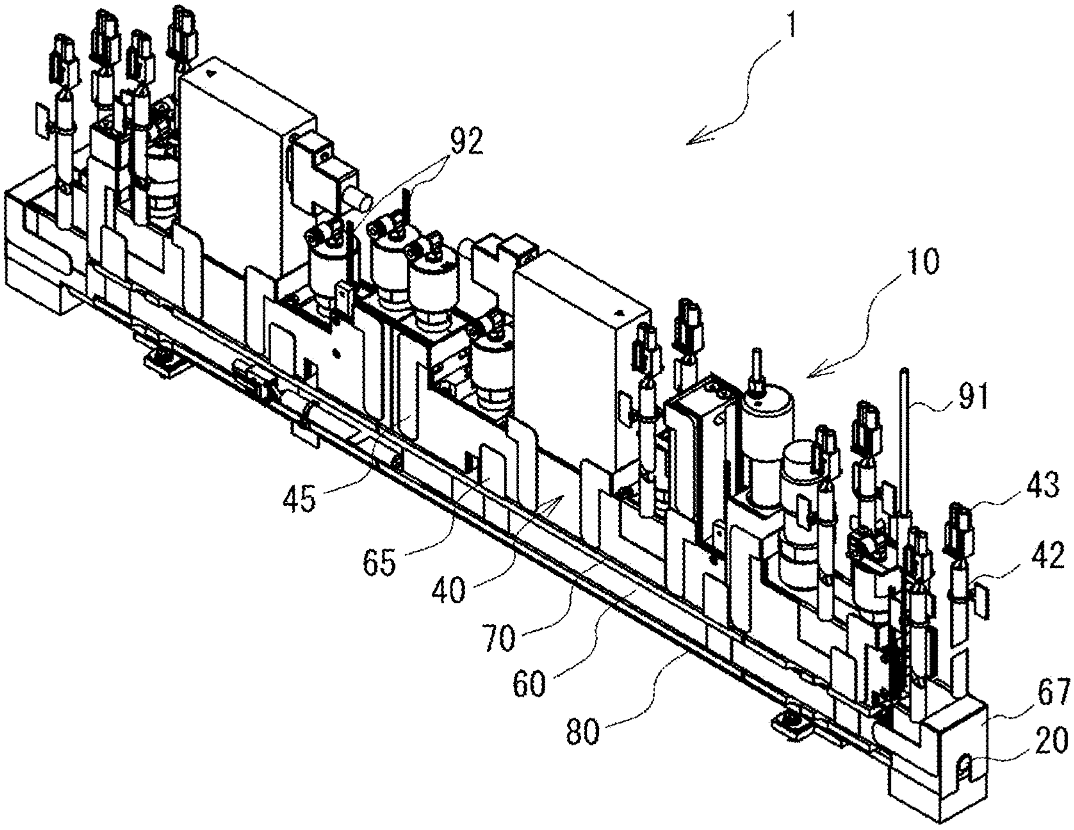

【fig. 2】
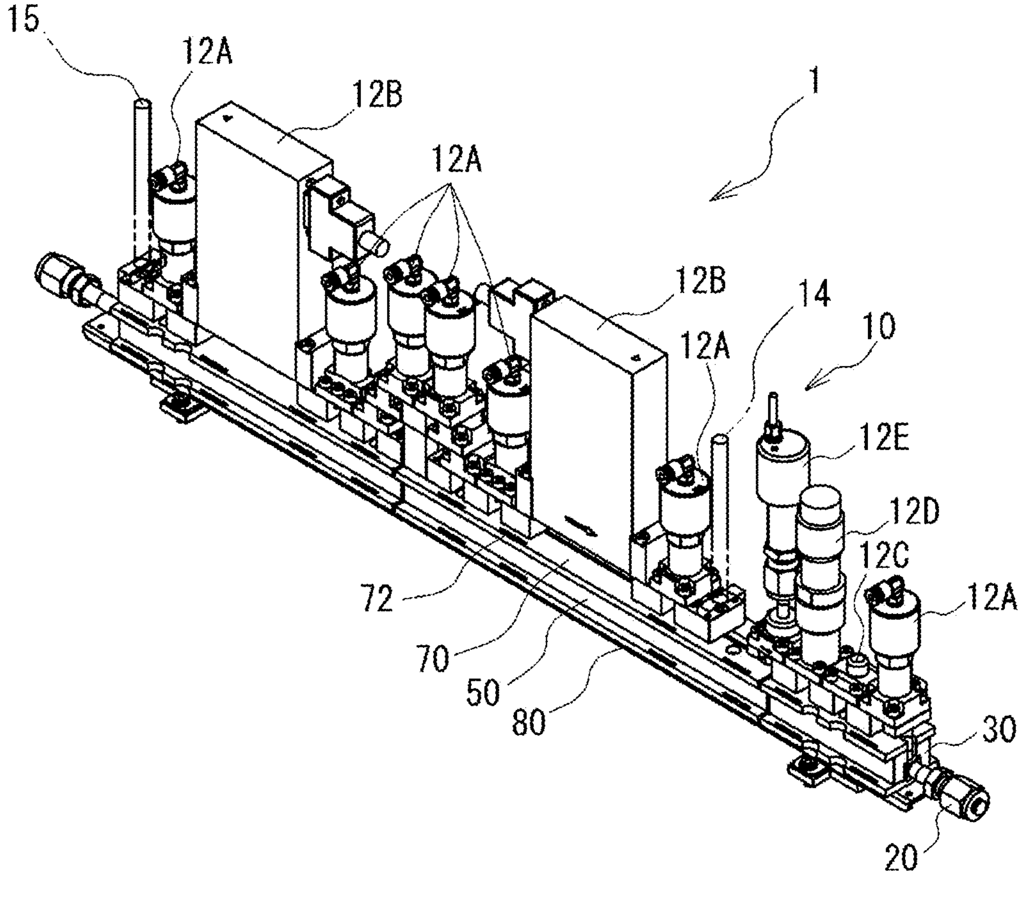

【fig. 3】
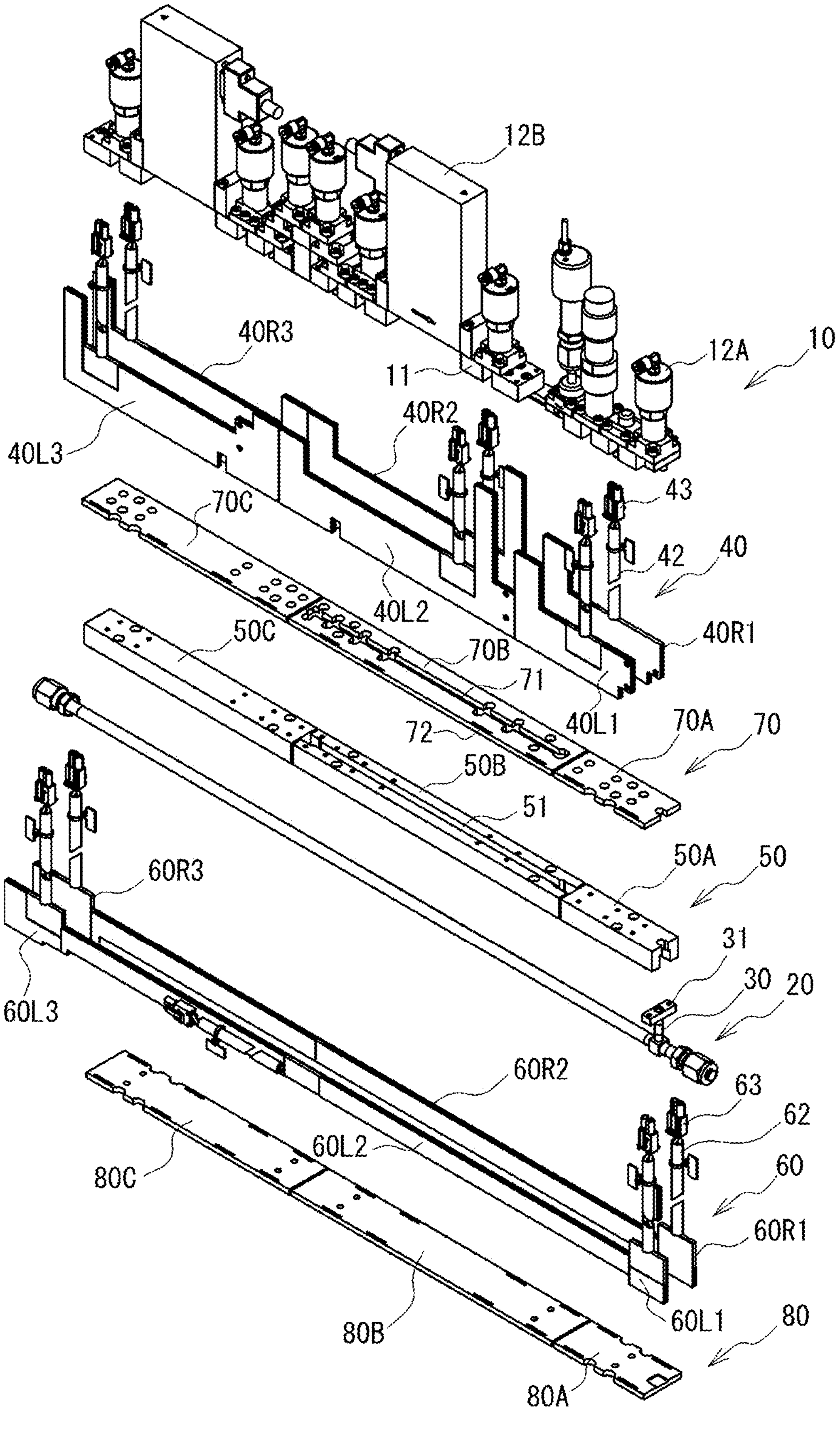

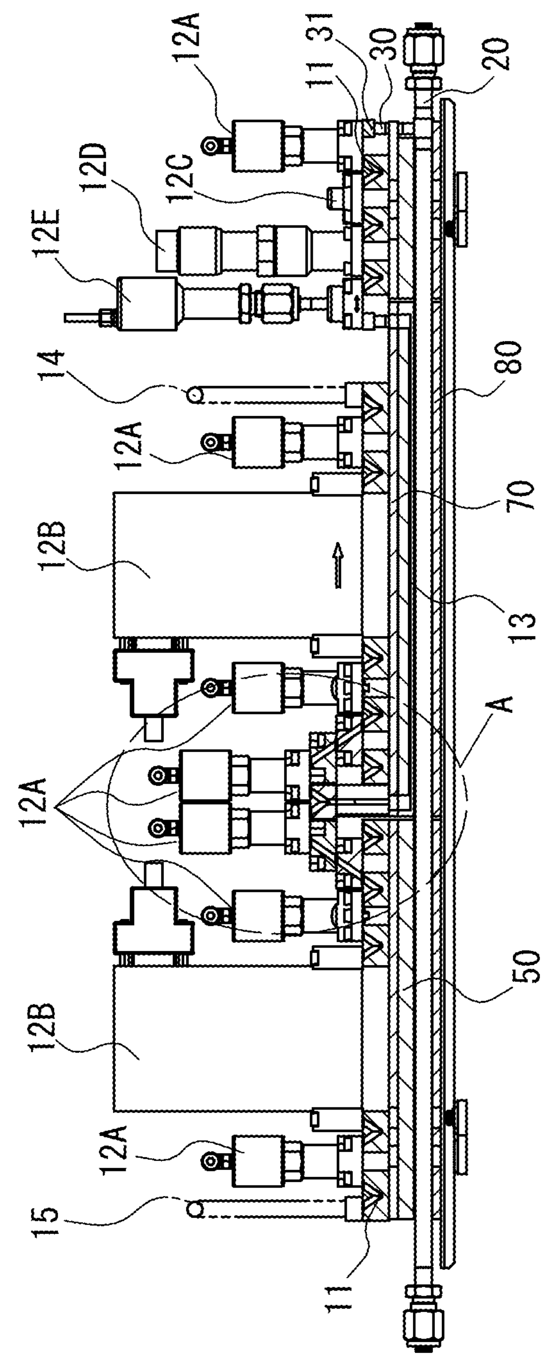
【fig. 4A】

【fig. 4B】
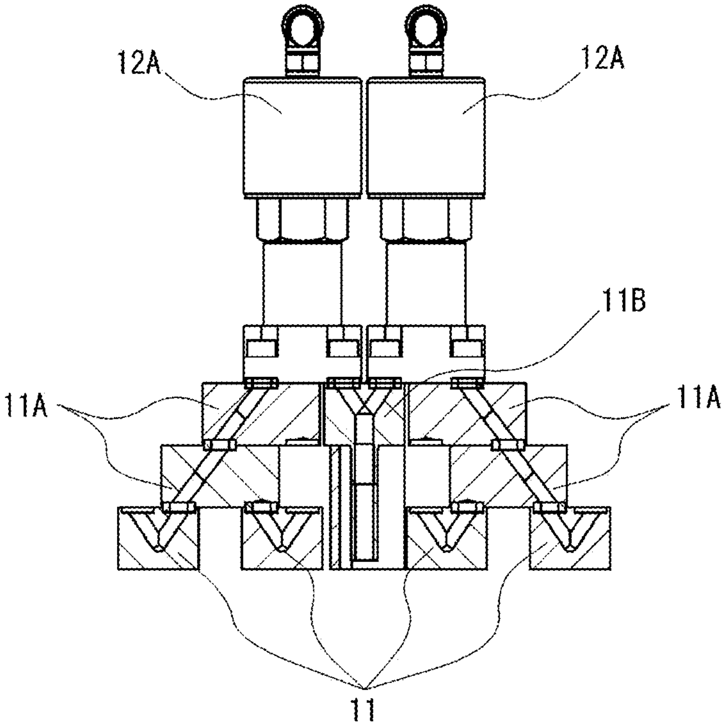

【fig. 5】
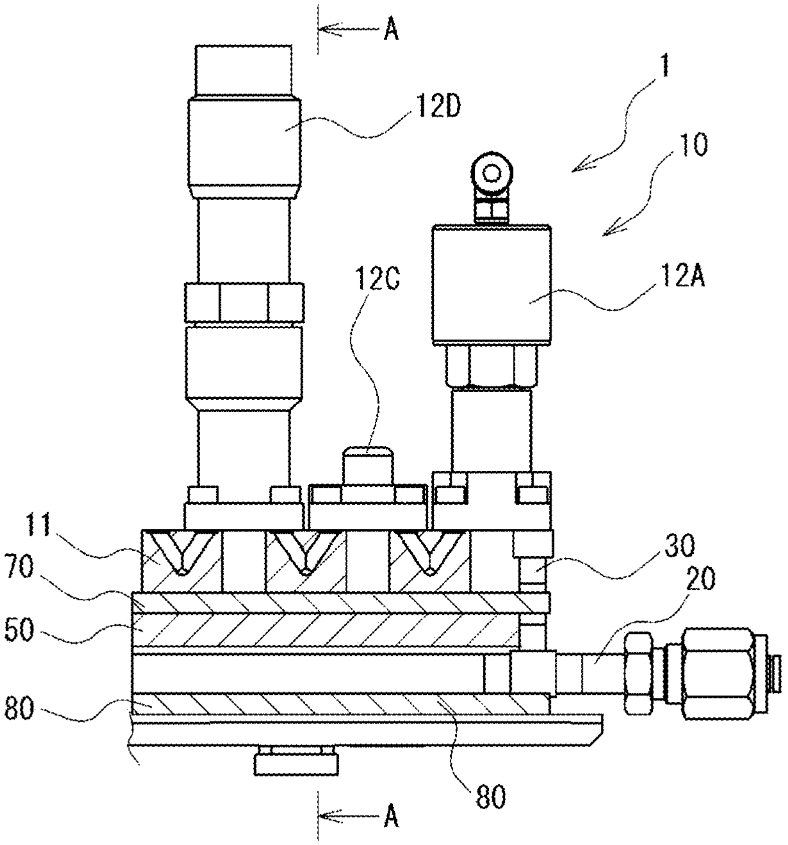

【fig. 6】
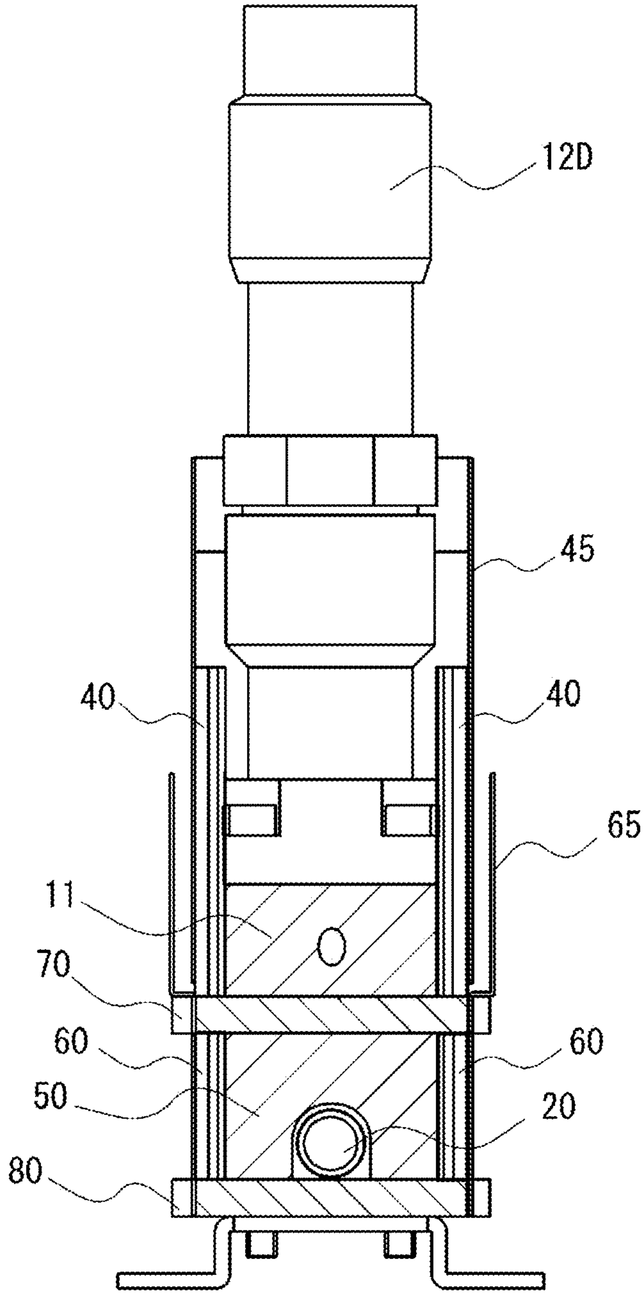

【fig. 7】
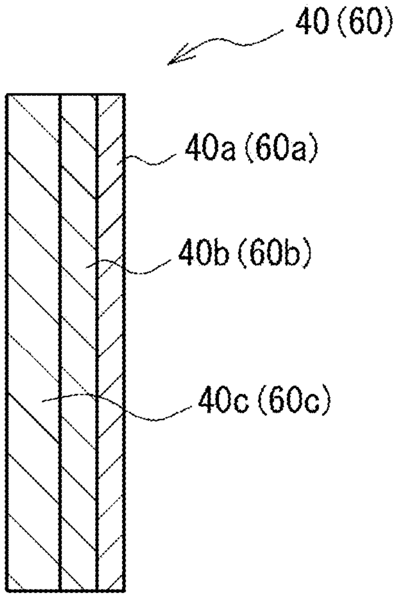

【fig. 8】
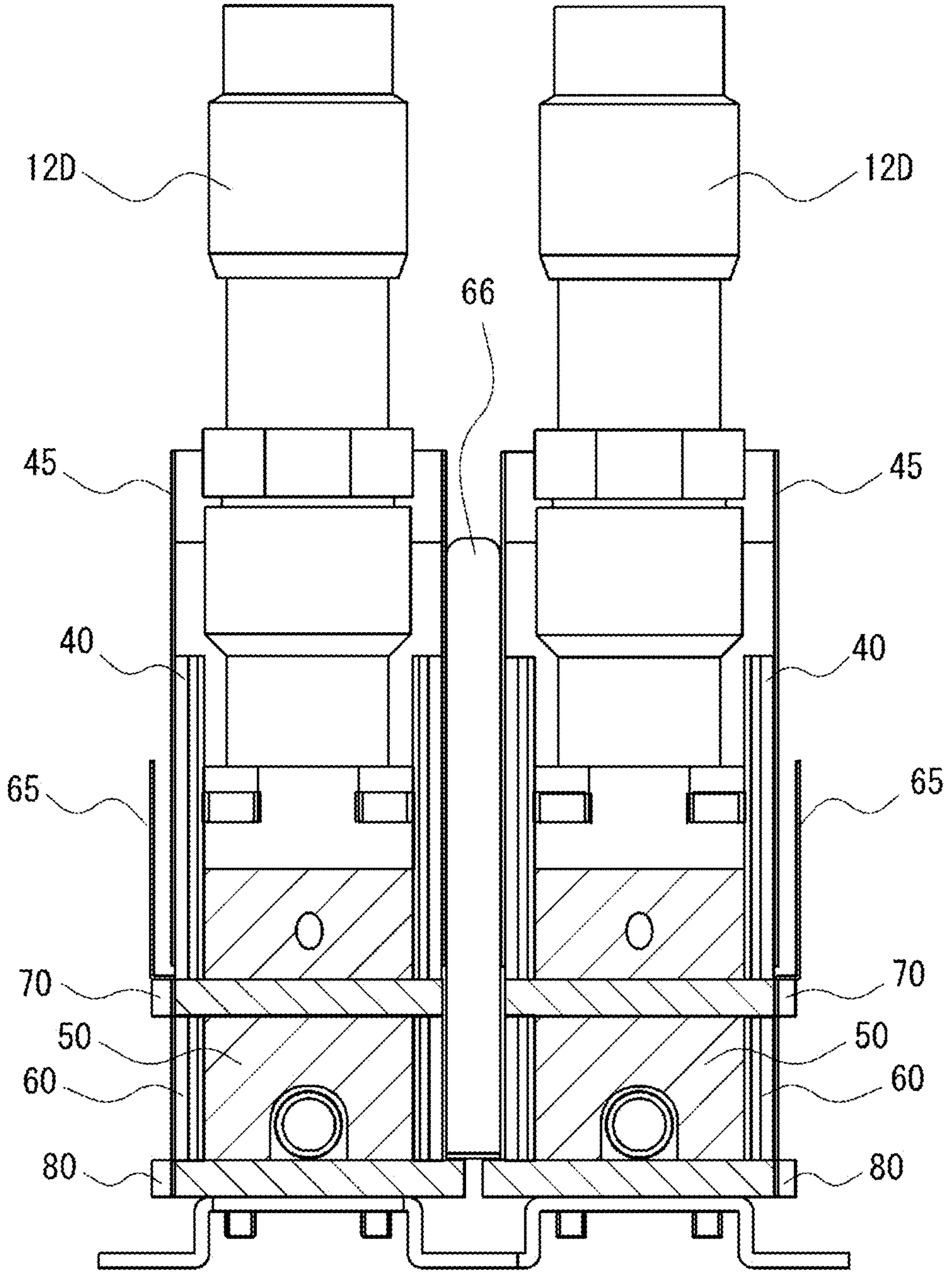

【fig. 9】
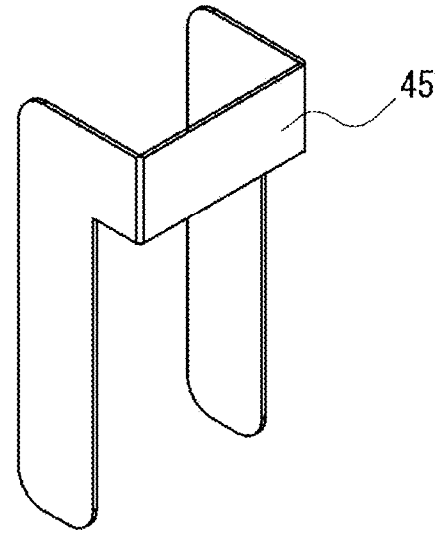
【fig. 10】
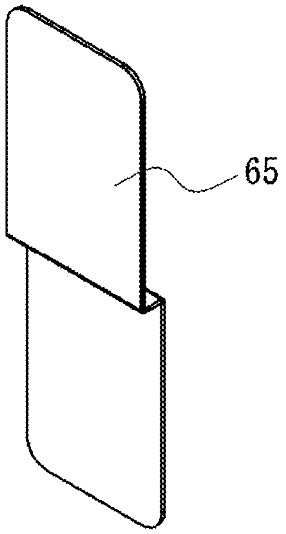

【fig. 11】
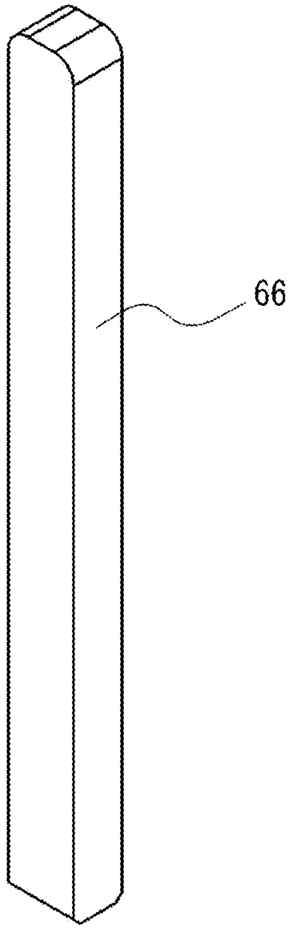

FLUID CONTROL APPARATUS AND HEATER

TECHNICAL FIELD

The present invention relates to a fluid control apparatus for supplying a process gas or the like to a semiconductor manufacturing apparatus, and a heater for heating the fluid control apparatus.

BACKGROUND ART

In a semiconductor-manufacturing process, a plurality of types of gases such as process gases and purging gases are supplied to a processing chamber, to perform a process such as film formation or etching.

In order to meter and supply such gases to the processing chamber, for example, for each type of process gas, there is provided an integrated gas line in which a plurality of fluid devices such as mass flow controllers and open-close valves are arranged on joint blocks arranged in columns.

A plurality of such integrated gas lines corresponding to a plurality of types of gases handled by one processing chamber are arranged in parallel in a gas box, and such a gas box is provided for each processing chamber in a semiconductor manufacturing apparatus having a plurality of processing chambers.

A supply pipe (also referred to as a crossover pipe) for supplying each type of gas passes, for example, through a plurality of gas boxes one after another and branches (one drop) in each gas box to supply the gas to a corresponding integrated gas line for the gas type. The supply pipe is arranged, for example, so as to extend in the direction of the integrated gas line under the integrated gas line in the gas box, and branches upward to supply the gas to the integrated gas line.

Such an integrated gas line may handle a gas that is easily condensed at a room temperature, and in order to prevent condensation of the gas to maintain the gas in a gas state, a temperature control of the entire integrated gas line is performed by using a heater.

For example, in Patent Literature 1, heaters are provided on both sides along the longitudinal direction of an integrated gas line having a plurality of fluid control devices, and the heaters are fixed with heater clips.

Further, in Patent Literature 2, flow path blocks constituting an integrated gas line are individually sandwiched by tape heaters (plate-shaped heaters) from both side surfaces and fixed by biasing members.

Further, in Patent Literature 3, a plurality of passage blocks on which fluid control devices are mounted is heated by heaters arranged to both sides of the plurality of passage blocks, and the pipes passing through the lower sides of the passage blocks are heated via a pipe heating member (heat-transfer member).

In Patent Literature 4 (JP-A-2016-205553), there is provided a heat-insulating cover for covering a gas line constituted by a plurality of fluid control devices connected via joints.

PRIOR ART

Patent Literature

PLT 1: JP-A-2020-159445
PLT 2: JP-A-H11-294615
PLT 3: Japanese U.S. Pat. No. 5,753,831
PLT 4: JP-A-2016-205553

SUMMARY OF INVENTION

Technical Problem

As described above, in a fluid control apparatus including integrated gas lines and supply pipes, a method of heating only the integrated gas lines or a method of integrally heating the integrated gas lines and the supply pipes is used. However, in a semiconductor manufacturing apparatus having a plurality of processing chambers, gases handled may differ between the processing chambers, and a certain processing chamber may not handle a certain gas. In such a case, in the corresponding gas box, there may be no integrated gas line corresponding to the gas, and only a supply pipe (crossover pipe) may be disposed. In this case, there is a problem that the supply pipe cannot be heated because there is no heater. Further, when the integrated gas line and the supply pipe are integrally heated, there is also a problem that the integrated gas line cannot be sufficiently heated.

Further, along with specification change of a semiconductor manufacturing apparatus, when making a modification of changing one integrated gas line into another integrated gas line, or a modification of changing a configuration including an integrated gas line with a supply pipe into a configuration including only a supply pipe without an integrated gas line, there is a problem that the change of the configuration is troublesome particularly in an integrated gas line having a heater.

It is an object of the present invention to solve these problems, and to provide a fluid control apparatus capable of independently performing a temperature control of an integrated gas line and a temperature control of a supply pipe (crossover pipe) and having a heater function while facilitating changing of a piping configuration, and to provide a heater for heating the fluid control apparatus.

Solution to Problem

In order to solve the above problem, the fluid control apparatus of the present invention comprises: an integrated gas line including a plurality of flow path blocks arranged in series to form a flow path and a plurality of fluid control devices arranged on the plurality of flow path blocks; a supply pipe arranged under the flow path blocks so as to extend in an arrangement direction of the flow path blocks and allowing a fluid to flow therethrough; and a branch pipe branched from the supply pipe and supplying the fluid to the integrated gas line, the fluid control apparatus further comprising: a first heater arranged on each of both sides of the flow path blocks; a heat transfer block having a prismatic shape having a substantially U-shaped cross section for encasing the supply pipe and transferring heat to the supply pipe; a second heater arranged on each of both sides of the heat transfer block and heating the heat transfer block; and a first heat insulation plate arranged between the flow path blocks and the heat transfer block and preventing a heat transfer between the flow path blocks and the heat transfer block.

In the fluid control apparatus, it is preferable that the apparatus further comprises a second heat insulation plate arranged under the heat transfer block and preventing a heat transfer from a lower surface of the heat transfer block.

It is preferable that the first heat insulation plate and the second heat insulation plate are fluororesin plates.

It is preferable that the first heater and the second heater are each formed by bonding together a stainless-steel plate, a silicone rubber heater and a silicone sponge from the flow path block side or the heat transfer block side.

It is preferable that the apparatus further comprises: a first temperature sensor for measuring a temperature of the flow path blocks or the fluid control devices; and a second temperature sensor for measuring a temperature of the heat transfer block.

It is preferable that the branch pipe is branched from the supply pipe upstream or downstream of a row of the flow path blocks.

A configuration may be adopted in which the plurality of flow path blocks includes first flow path blocks each being a rectangular parallelepiped having a V-shaped flow path formed therein for communicating two ports in an upper surface, and second flow path blocks each being a rectangular parallelepiped having an oblique flow path formed therein for communicating two respective ports in an upper surface and a lower surface at positions laterally offset from each other, wherein at least one stage of the second flow path blocks are arranged on an arrangement of the first flow path blocks, and the fluid control device is arranged on the second flow path blocks.

The heater of the present invention is a heater for heating a fluid control apparatus, the fluid control apparatus comprising: an integrated gas line including a plurality of flow path blocks arranged in series to form a flow path and a plurality of fluid control devices arranged on the plurality of flow path blocks, the heater arranged on both sides of the flow path blocks and heating the flow path blocks, the heater formed by bonding together a stainless-steel plate, a silicone rubber heater and a silicone sponge from the flow path block side.

Advantageous Effects of Invention

According to the fluid control apparatus of the present invention, since the integrated gas line can be heated independently by the first heater and the supply pipe can be heated independently by the second heater, the supply pipe can be sufficiently heated even in a configuration of only the supply pipe, and the integrated gas line can be sufficiently heated even in a case where both of the integrated gas line and the supply pipe (crossover pipe) are heated, or in a case where they are heated at different temperatures.

Further, since the integrated gas line and the supply pipe are lied out in a two-layer structure and they are connected by a branch pipe, it is possible to easily change from one integrated gas line to another integrated gas line or from a configuration including the integrated gas line and the supply pipe to a configuration including only the supply pipe without the integrated gas line by simply detaching and attaching the integrated gas line on the upper side with the heaters attached, and it is possible to easily cope with a specification change of a semiconductor manufacturing apparatus.

Further, according to the heater of the present invention, since a high-thermally conductive stainless-steel plate is disposed on the inner layer side, it is possible to uniformly distribute a heat from a heating wire in the rubber heater to the flow path blocks and the heat transfer block uniformly. In addition, since the silicone sponge of the outer layer has heat insulating property, heat of the heater is not dispersed to the outside, so that the impact on the outside can be reduced and this contributes to energy saving. Further, since the silicone sponge of the outer layer also has elasticity, it is easy to fix the heater with a heater fixture (such as a heater clip).

BRIEF DESCRIPTION OF DRAWINGS

FIG. 1 is a perspective view of a fluid control apparatus according to the present invention;

FIG. 2 is a perspective view of the fluid control apparatus of FIG. 1 with heaters removed;

FIG. 3 is an exploded perspective view of the fluid control apparatus of FIG. 1.

FIG. 4A is a longitudinal cross-sectional view of the fluid control apparatus of FIG. 1.

FIG. 4B is an enlarged view of part A of FIG. 4A.

FIG. 5 is an enlarged longitudinal cross-sectional view of a right end portion of FIG. 4A.

FIG. 6 is an A-A cross-sectional view of FIG. 5.

FIG. 7 is a cross-sectional view schematically showing a cross-sectional structure of a heater.

FIG. 8 is an A-A cross-sectional view in which two rows of fluid control apparatuses are arranged in FIG. 6.

FIG. 9 shows an integrated gas line side heater fixture.

FIG. 10 shows a supply pipe side heater fixture.

FIG. 11 shows a supply pipe side heater fixing rod.

DESCRIPTION OF EMBODIMENTS

Hereinafter, embodiments of the present invention will be described with reference to the drawings. In the description, the same elements are denoted by the same reference numerals, and redundant description will be omitted as appropriate.

FIG. 1 is a perspective view of a fluid control apparatus 1 according to the present embodiment, FIG. 2 is a perspective view showing a state in which the heater of the apparatus of FIG. 1 is removed, FIG. 3 is a perspective view showing a state in which the heater of the apparatus of FIG. 1 is removed, and FIG. 4A is a longitudinal cross-sectional view showing the device of FIG. 1.

The fluid control apparatuses 1 of the present invention are ones generally arranged in parallel in a gas box to control respective gases, and as shown in FIG. 3, each fluid control device 1 includes an integrated gas line 10, a supply pipe (crossover pipe) 20, a branch pipe 30, a first heater 40, a heat transfer block 50, a second heater 60, a first heat insulation plate 70, and a second heat insulation plate 80.

The integrated gas line 10 includes, as shown in 4A, a plurality of flow path blocks 11 arranged in series to form a flow path and a plurality of fluid control devices 12A to 12E arranged thereon.

The flow path blocks 11 (also referred to as first flow path blocks) are each a stainless-steel rectangular parallelepiped block having two ports in upper surface, and a V-shaped flow path for communicating these ports is formed therein.

Here, as shown enlarged in FIG. 4B, the central portion of the integrated gas line 10 has a row of flow path blocks 11, on which two stages of further flow path blocks 11A (also referred to as second flow path blocks) are arranged, and two fluid control devices 12A are arranged thereon. The flow path blocks 11A each has ports in an upper surface and a lower surface, respectively, that are laterally offset from each other, and an oblique flow path communicating the ports is formed in the interior. A flow path block 11B is connected to a part of each of lower surfaces of two fluid control devices 12A arranged on the flow path blocks 11A, the flow path block 11B has two ports in an upper surface and one port in a lower surface, and a Y-shaped flow path is formed in the inside. With this raising structure, a space for a joint structure for connecting a bypass pipe 13 to be described later to the lower side of the flow path block 11B on the upper stage can be secured. Accordingly, the position of the bypass pipe 13 can be raised to reduce the interference with the first heat insulation plate 70 and the heat transfer block 50 on the lower stage, and the modularity of the integrated gas line 10 can be improved. It should be noted that even when the bypass pipe 13 is provided, the arrangement of the flow path blocks 11 may have a raised structure of only one stage or a structure of only flow path blocks 11 without the raised structure, depending on how the bypass pipe 13 is connected.

However, in the present invention, the arrangement of flow path blocks 11, 11A, 11B is not limited to this, and any arrangement may be used as long as it is in series.

The fluid control devices 12A to 12D are devices that control a fluid, each having a rectangular parallelepiped body on a lower side and two ports in the bottom surface. The fluid control devices 12A to 12D are, as shown in FIG. 4A, with the exception of some, arranged to bridge two flow path blocks 11, 11A or 11B that are adjacent to each other, and fixed with screws, so that the ports in the bottom surface of body communicate with the ports in upper surfaces of the flow path blocks 11, 11A or 11B.

The fluid control device 12A is an open-close valve, 12B is a mass flow controller, 12C is a through block, 12D is a pressure regulator, and 12E is a pressure sensor. However, in the present invention, the fluid control device is not limited thereto, and various types of fluid control devices may be used. For example, 12C may be a filter instead of a through block.

In this embodiment, a bypass pipe 13 is provided from the port in a bottom surface of the fluid control device (pressure-sensor) 12D to a port in a lower surface of the flow path block 11B (see FIG. 4B). Thus, the fluid that has been introduced from the branch pipe 30 to the fluid control device 12A at the right end of the drawing and has passed through the fluid control devices 12C to 12E is introduced into the flow path block 11B by the bypass pipe 13. Then, the flow path branches into two flow paths, one flows to the right of the drawing and passes through the fluid control devices 12A, 12B and is output from the output pipe 14, and the other flows to the left of the drawing and passes through the fluid control devices 12A, 12B and is output from the second output pipe 15. In order to avoid interference with the bypass pipe 13, the first heat insulation plate 70 and the heat transfer block 50 described later are provided with slit-shaped openings 71 and 51 (see FIG. 3).

The supply pipe 20 is also referred to as a crossover pipe, and as shown in FIG. 4A, that is arranged under flow path blocks 11 so as to extend in the arrangement direction of flow path blocks 11 and allows a fluid to flow therethrough. This supply pipe 20 constitutes, for example, a part of a pipe system that extends from a gas supply source, sequentially passes through a plurality of gas boxes and branches (one-drop) in each gas box to supply a gas to an integrated gas line of a corresponding gas type.

The branch pipe 30 is a pipe that branches from the supply pipe 20 and supplies a fluid to the integrated gas line 10. In the present embodiment, the branch pipe 30 branches from the supply pipe 20 upstream of the row of flow path blocks 11, and is connected to the bottom surface of the fluid control device (open-close valve) 12A via a connecting plate 31 (see FIG. 3). However, the present invention is not limited to this configuration, and it may be branched from the supply pipe 20 downstream of the row of flow path blocks.

By providing the branch pipe 30 from the supply pipe 20 upstream or downstream of the row of flow path blocks, the integrated gas line 10 is easily attached to and detached from the supply pipe 20.

The first heater 40 is a heater that is arranged to each of both side surfaces of flow path blocks 11 to heat the flow path blocks 11.

In terms of the outer shape, as shown in FIGS. 1 and 3, in order to cover the side surfaces of each of flow path blocks 11, 11A, 11B and lower side surfaces of each of fluid control devices 12A to 12E, the heater on each side is divided into 3 pieces, that are three left side heater segments 40L1 to 40L3 and three right side heater segments 40R1 to 40R3 along the flow direction of the feed pipe. Incidentally, the portions protruding upward from the left heater segments 40R2, 40R3 and the right heater segments 40L2, 40L3 are portions covering the output pipes 14 and 15.

A power supply cable 42 extends from each of the heater segments 40L1 to 40R3, and a connector 43 is attached to distal end thereof.

As shown schematically in FIG. 7, each of the heater segments 40L1 to 40R3 has a cross-sectional configuration formed by bonding together a stainless-steel plate 40*a*, a silicone rubber heater 40*b* and a silicone sponge 40*c* from the flow path block 11 side.

The silicone rubber heater 40*b* is formed by sandwiching a heating wire with sheet-shaped silicone rubber from both sides, and generates heat when the heating wire is energized.

The silicone sponge 40*c* is a foam of silicone rubber and is a sponge-like sheet containing a large number of cells.

This configuration allows the heat from the heating wires in the silicone rubber heater 40*b* be uniformly distributed by the highly thermally conductive stainless-steel plate so that flow path blocks 11 can be uniformly heated. In addition, since the silicone sponge 40*c* of the outer layer has heat insulating properties, the heat of the heaters is not dispersed to the outside, so that the impact on the outside can be reduced and this contributes to energy saving.

As shown in FIG. 6, the heater segments 40L1 to 40R3 of the first heater 40 are pressed against the flow path blocks by being sandwiched from left and right sides by heater fixtures 45 each formed of a clip-shaped leaf spring shown in FIG. 9.

The silicone sponge 40*c* of the outer layer of each of the heater segments 40L1 to 40R3 also has elasticity, and thus is easily fixed by the heater fixture 45.

The first heat insulation plate 70 is a plate arranged between the flow path blocks 11 and the heat transfer block 50, and prevents heat transfer between each flow path block 11 and the heat transfer block 50, which will be described later.

The first heat insulation plate 70 is divided into three heat insulation plate segments 70A to 70C as shown in FIG. 3 to cover the entire length of the row of flow path blocks 11.

The heat insulation plate segment 70B is provided with a slit-shaped opening 71 in order to avoid interference with the bypass pipe 13.

In the present embodiment, the material of the first heat insulation plate is a fluororesin, specifically, a PTFE such as Teflon (registered trademark). The fluororesin plate is heat-insulating and heat-resistant, so that it can cope with high-temperature fluids.

Slits 72 extending in the longitudinal direction are provided in the vicinity of both sides in the width direction of the heat insulation plate segments 70A to 70C, so that second heater fixtures 65 to be described later can be inserted. The heat insulation plate segments 70A to 70C shown in FIG. 3 are those for the heater fixing structure of FIG. 8 to be described later, and therefore, the slits 72 are provided only on one side in the width direction. However, the heat insulation plate segments 70A to 70C for the heater fixing structure of FIG. 6 are provided with the slits 72 on both sides in the width direction.

As shown in FIGS. 3 and 6, the heat transfer block 50 has a prismatic shape having a substantially U-shaped cross section, and is a block that encases the supply pipe 20 and transfers heat to the supply pipe 20. In the present embodiment, the heat transfer block 50 is a block made of aluminum having high thermal conductivity, and is formed in a curved surface along the outer periphery of the supply pipe 20 on the inner surface side in order to enhance heat transfer to and from the supply pipe 20.

The heat transfer block 50 is divided into three block segments 50A to 50C as shown in FIG. 3 in order to cover the entire length of the row of flow path blocks 11. The block segment 50B is provided with a slit-shaped opening 51 in order to avoid interfere with the bypass pipe 13.

The second heater 60 is a heater that is arranged to each of both side surfaces of the heat transfer block 50 to heat the heat transfer block 50.

In terms of the outer shape, as shown in FIGS. 1 and 3, in order to cover the side surfaces over the entire length of the heat transfer block 50, the heater on each side is divided into three sheets, that are three heater segments 60L1 to 60L3 on the left side and three heater segments 60R1 to 60R3 on the right side along the flow direction of the feed pipe.

Similar to the first heater 40, a power supply cable 62 extends from each of the heater segments 60L1 to 60R3, and a connector 63 is attached to the distal end thereof.

The cross-sectional configuration of the second heater 60 is, like the first heater, configured by bonding together a stainless-steel plate 60*a*, a silicone rubber heater 60*b*, and a silicone sponge 60*c* from the heat transfer block 50 side as schematically shown in FIG. 7.

As shown in the cross-sectional view of FIG. 6, the heater segments 60L1 to 60R3 of the second heater 60 are pressed against and fixed to the heat transfer blocks 50 by inserting second heater fixtures 65 shown in FIG. 10 into the slits 72 (see FIG. 3) of the first heat insulation plate 70. The silicone sponge 60*c* of the outer layer of each of the heater segment 60L1 to 60R3 also has elasticity, and thus is easily fixed by the heater fixture 65. The front-end portion of the heater segment 60L1 and the rear end portion of the heater segment 60R3 are covered with a cover 67 (see FIG. 1) for heat insulation.

FIG. 8 is an A-A cross-sectional view in FIG. 6 when two rows of fluid control apparatuses 1 are arranged.

In this embodiment, since the inner side of the neighboring fluid control apparatuses 1 is narrow in spacing and there is no space for inserting the second heater fixtures 65 to fix the second heaters 60, the second heaters 60 of the inner side are fixed by inserting a heater fixing rod 66 made of Teflon (registered trademark) between the fluid control apparatuses 1.

The longitudinal positions at which the heater fixing rods 66 are inserted are substantially opposite positions of the arrangement positions of the second heater fixtures 65 of the outer side.

The second heat insulation plate 80 is a plate that is arranged under the heat transfer block 50 and prevents heat transfer from the lower surface of the heat transfer block 50. The second heat insulation plate 80 is also divided into three heat insulation plate segments 80A to 80C as shown in FIG. 3 to cover the entire length of the row of flow path blocks 11. Similarly to the first heat insulation plate 70, the material of the second heat insulation plate 80 is also a fluororesin, specifically, a PTFE such as Teflon (registered trademark) in the present embodiment.

With this configuration, the heat of the heat insulation plate is not dispersed to the outside, and the impact on the outside can be reduced, and the heat insulation plate also contributes to energy saving.

As shown in FIG. 1, the fluid control apparatus 1 of this embodiment further includes a first temperature sensor 91 and second temperature sensors 92. The first temperature sensor 91 is a thermocouple that measures the temperature of flow path blocks 11 and the fluid control devices 12A to 12E, and the second temperature sensors 92 are thermostats that measure the temperature of the heat transfer block.

Since the outputs of the first temperature sensor 91 and the second temperature sensors 92 can be inputted to a control unit (not shown) through a known interface, the control unit can monitor the temperature of flow path blocks 11 or the fluid control devices 12 and the temperature of the heat transfer block 50, and can control the first heater 40 and the second heater 60 so that these temperatures become respective set temperatures.

According to the present embodiment, since the integrated gas line 10 can be heated independently by the first heater 40 and the supply pipe (crossover pipe) 20 can be heated independently by the second heater 60, the supply pipe 20 can be heated in a configuration of the supply pipe 20 alone, and the integrated gas line 10 can be sufficiently heated even in a case of heating both the integrated gas line and the supply pipe 20.

Further, since the integrated gas line 10 and the supply pipe 20 are lied out in the two-layer structure and they are connected by the branch pipe 30, only by attaching and detaching the integrated gas line 10 on the upper side with the heaters 40 and 60 attached, it is possible to easily change from one integrated gas line 10 to another integrated gas line 10, or from a configuration including the integrated gas line 10 and the supply pipe 20 to a configuration including only the supply pipe 20, and it is possible to easily cope with a specification change of semiconductor manufacturing apparatus.

Further, according to the first and second heaters 40 and 60 of the present embodiment, since a highly thermally conductive stainless-steel plate is used on the inner layer side, the heat from the heating wire in the silicone rubber heaters 40*b*, 60*b* can be uniformly distributed to uniformly heat the flow path blocks 11 and the heat transfer block 50. In addition, since the silicone sponges 40*c*, 60*c* of the outer layer have heat insulating properties, the heat of the silicone rubber heaters 40*b*, 60*b* is not dispersed to the outside, so that the impact on the outside can be reduced and this contributes to the energy saving. Further, since the silicone sponges 40*c*, 60*c* of the outer layer also have elasticity, the heaters are easily fixed by the heater fixtures 45 and 65.

Although the embodiments of the present invention have been described in detail above, the present invention is not limited to such particular embodiments, and various modifications and changes can be made within the scope of the gist of the present invention described in claims.

For example, in the above-described embodiments, the second heat insulation plate 80 that prevents heat transfer from the lower surface of the heat transfer block 50 is provided, but it is not necessary to provide the second heat insulation plate when, for example, the temperature setting is low and the dispersion of heat to the outside is not a problem.

In addition, although fluororesin plates are used as the first heat insulation plate 70 and the second heat insulation plate 80, plates of another material may be used as long as they have heat insulating property and heat resistance.

In addition, the first heater 40 and the second heater 60 have the above-described three-layer configuration, but in fluid control apparatus of the present invention, other configurations may be adopted as long as the controllability of the temperature and the heat insulating property are provided.

In addition, although the first temperature sensor 91 and the second temperature sensor 92 are provided in the present embodiment, for example, in a case where precise temperature control is not required, power control of the heater may be simply performed without providing these sensors.

Further, in the present embodiment, the branch pipe 30 is branched from the supply pipe 20 on the upstream side of the row of flow path blocks 11, but the branch pipe 30 may be branched on the downstream side, or as long as it is easy to separate, it may be branched at the central portion.

REFERENCE SIGNS LIST

1: Fluid control apparatus
10: Integrated gas line
11: Flow path block (first flow path block)
11A: flow path block (second flow path block)
11B: flow path block
12: Fluid control device
12A to 12E: Fluid-control device
13: Bypass pipe
14: First output pipe
15: Second output pipe
20: Supply pipe
30: Branch pipe
31: Connecting plate
40: First heater
40L1 to 40R3: Heater segment
40*a*: Stainless steel plate
40*b*: Silicone rubber heater
40*c*: Silicone sponge
42: Power supply cable
43: Connector
45: Heater fixture
50: Heat transfer block
50A to 50C: Block segment
51: Opening
60: Second heater
60L1 to 60R1: Heater segment
60*a*: Stainless steel plate
60*b*: Silicone rubber heater
60*c*: Silicone sponge
62: Power supply cable
63: Connector
65: Second heater fixture
66: Heater fixing rod
67: Cover
70: First heat insulation plate
70A to 70C: Heat insulation plate segment
71: Opening

72: Slit
80: Second heat insulation plate
80A to 80C: Heat insulation plate segment
91: First temperature sensor
92: Second temperature sensor

The invention claimed is:

1. A fluid control apparatus comprising: an integrated gas line including a plurality of flow path blocks arranged in series to form a flow path and a plurality of fluid control devices arranged on the plurality of flow path blocks; a supply pipe arranged under the flow path blocks so as to extend in an arrangement direction of the flow path blocks and allowing a fluid to flow therethrough; and a branch pipe branched from the supply pipe and supplying the fluid to the integrated gas line, the fluid control apparatus further comprising:

a first heater arranged on each of both sides of the flow path blocks;

a heat transfer block having a prismatic shape having a substantially U-shaped cross section for encasing the supply pipe and transferring heat to the supply pipe;

a second heater arranged on each of both sides of the heat transfer block and heating the heat transfer block; and a first heat insulation plate arranged between the flow path blocks and the heat transfer block and preventing a heat transfer between the flow path blocks and the heat transfer block.

2. The fluid control apparatus according to claim 1, further comprising a second heat insulation plate arranged under the heat transfer block and preventing a heat transfer from a lower surface of the heat transfer block.

3. The fluid control apparatus according to claim 2, wherein the first heat insulation plate and the second heat insulation plate are fluoro-resin plates.

4. The fluid control apparatus according to claim 1, wherein the first heater and the second heater are each formed by bonding together a stainless-steel plate, a silicone rubber heater and a silicone sponge from the flow path block side or the heat transfer block side.

5. The fluid control apparatus according to claim 1, further comprising: a first temperature sensor for measuring a temperature of the flow path blocks or the fluid control devices; and a second temperature sensor for measuring a temperature of the heat transfer block.

6. The fluid control apparatus according to claim 1, wherein the branch pipe is branched from the supply pipe upstream or downstream of a row of the flow path blocks.

7. The fluid control apparatus according to claim 1, wherein the plurality of flow path blocks includes first flow path blocks each being a rectangular parallelepiped having a V-shaped flow path formed therein for communicating two ports in an upper surface, and second flow path blocks each being a rectangular parallelepiped having an oblique flow path formed therein for communicating two respective ports in an upper surface and a lower surface at positions laterally offset from each other, wherein at least one stage of the second flow path blocks are arranged on an arrangement of the first flow path blocks, and the fluid control device is arranged on the second flow path blocks.

* * * * *